US010963891B2

(12) United States Patent
Sharma et al.

(10) Patent No.: US 10,963,891 B2
(45) Date of Patent: Mar. 30, 2021

(54) SECURE CONVERSION TRACKING (71) Applicant: Google LLC, Mountain View, CA (US)

(72) Inventors: Abhinay Sharma, Los Altos, CA (US); Kai Chen, San Bruno, CA (US)

(73) Assignee: Google LLC, Mountain View, CA (US)

( * ) Notice: Subject to any disclaimer, the term of this patent is extended or adjusted under 35 U.S.C. 154(b) by 493 days.

(21) Appl. No.: 15/666,378

(22) Filed: Aug. 1, 2017

(65) Prior Publication Data

US 2017/0345023 A1 Nov. 30, 2017

Related U.S. Application Data

(63) Continuation of application No. 11/520,351, filed on Sep. 12, 2006, now abandoned.

(51) Int. Cl.
*G06Q 30/00* (2012.01)
*G06Q 30/02* (2012.01)

(52) U.S. Cl.
CPC .................................. *G06Q 30/02* (2013.01)

(58) Field of Classification Search
None
See application file for complete search history.

(56) References Cited

U.S. PATENT DOCUMENTS

| | | |
|---|---|---|
| 5,930,772 A | 7/1999 | Gomyo et al. |
| 5,948,061 A | 9/1999 | Merriman et al. |
| 6,006,197 A | 12/1999 | d'Eon et al. |
| 6,016,504 A | 1/2000 | Arnold et al. |
| 6,134,532 A | 10/2000 | Lazarus et al. |
| 6,285,999 B1 | 9/2001 | Page |
| 6,421,675 B1 | 7/2002 | Ryan et al. |
| 6,928,426 B2 | 8/2005 | Dake |

(Continued)

FOREIGN PATENT DOCUMENTS

| | | |
|---|---|---|
| EP | 1083504 | 3/2001 |
| KR | 19990053067 | 7/1999 |

(Continued)

OTHER PUBLICATIONS

Brin et al., "The Anatomy of a Large-Scale Hypertextual Search Engine", Seventh International World Wide Web Conference, Brisbane, Australia, Apr. 14-18, 1998, 20 pages.

(Continued)

*Primary Examiner* — Alvin L Brown
(74) *Attorney, Agent, or Firm* — Fish & Richardson P.C.

(57) ABSTRACT

In response to a conversion action associated with an online advertisement ("ad"), an advertiser associated with the ad generates a unique identifier (e.g., a pseudo random number), which is transmitted to a payment system through a user device. In some implementations, the unique identifier can be generated by a payment system in response to a request from an advertiser. The advertiser stores the unique identifier in a secure location that is accessible by the payment system. The payment system compares the received unique identifier with the stored unique identifier. If the received unique identifier matches the stored unique identifier, and if the received unique identifier was not previously generated by the advertiser, then the payment system deems the conversion action to be valid.

20 Claims, 6 Drawing Sheets

(56) References Cited

U.S. PATENT DOCUMENTS

| | | |
|---|---|---|
| 7,383,377 B2 | 6/2008 | Arataki et al. |
| 7,734,502 B1 | 6/2010 | Yehoshua et al. |
| 2002/0004733 A1 | 1/2002 | Addante |
| 2002/0016717 A1 | 2/2002 | Ponzio, Jr. |
| 2002/0040318 A1 | 4/2002 | Amano et al. |
| 2002/0078192 A1 | 6/2002 | Kopsell et al. |
| 2002/0095331 A1 | 7/2002 | Osman et al. |
| 2002/0138501 A1* | 9/2002 | Dake .................. G06F 16/10 |
| 2003/0014304 A1 | 1/2003 | Calvert et al. |
| 2003/0097564 A1 | 5/2003 | Tewari |
| 2003/0109249 A1 | 6/2003 | Frantz |
| 2003/0195837 A1 | 10/2003 | Kostic et al. |
| 2004/0044571 A1 | 3/2004 | Bronnimann et al. |
| 2004/0059708 A1 | 3/2004 | Dean et al. |
| 2004/0153367 A1 | 8/2004 | Lapstun et al. |
| 2005/0006466 A1 | 1/2005 | Overhultz et al. |
| 2005/0055269 A1 | 3/2005 | Roetter et al. |
| 2005/0086169 A1 | 4/2005 | Wells et al. |
| 2005/0097040 A1 | 5/2005 | Chen et al. |
| 2005/0160002 A1 | 7/2005 | Roetter et al. |
| 2005/0273388 A1 | 12/2005 | Roetter |
| 2006/0031117 A1 | 2/2006 | Zohar et al. |
| 2006/0116924 A1 | 6/2006 | Angles et al. |
| 2006/0149641 A1 | 7/2006 | Loeb et al. |
| 2006/0184417 A1 | 8/2006 | Van der Linden et al. |
| 2006/0206386 A1 | 9/2006 | Walker et al. |
| 2006/0259468 A1 | 11/2006 | Brooks et al. |
| 2007/0033104 A1 | 2/2007 | Collins et al. |
| 2007/0131177 A1 | 6/2007 | Perkitny |
| 2007/0260516 A1 | 11/2007 | Schoen et al. |
| 2008/0010112 A1 | 1/2008 | Kniaz et al. |
| 2008/0010143 A1 | 1/2008 | Kniaz |
| 2008/0065474 A1 | 3/2008 | Sharma |
| 2008/0255915 A1 | 10/2008 | Collins et al. |
| 2008/0270243 A1 | 10/2008 | Lewis et al. |
| 2012/0130803 A1 | 5/2012 | Kniaz et al. |
| 2012/0134478 A1* | 5/2012 | Broman ............... G06Q 20/341 379/88.02 |
| 2013/0096966 A1 | 4/2013 | Barnes, Jr. |
| 2013/0144724 A1 | 6/2013 | Ramer et al. |
| 2014/0067690 A1* | 3/2014 | Pitroda .................. G06Q 20/02 705/71 |

FOREIGN PATENT DOCUMENTS

| | | |
|---|---|---|
| KR | 20000030679 | 6/2000 |
| KR | 1020030043827 | 6/2003 |
| WO | WO9954828 | 10/1999 |
| WO | WO0109789 | 2/2001 |
| WO | WO0139023 | 5/2001 |
| WO | WO0141030 | 6/2001 |
| WO | WO03050744 | 6/2003 |
| WO | WO2007150055 | 12/2007 |
| WO | WO2008/033868 | 3/2008 |

OTHER PUBLICATIONS

Office Action from U.S. Appl. No. 10/653,899, dated Oct. 6, 2009, 16 pages.

Supplementary European Search Report dated Jul. 23, 2008 issued in International Application No. 05733817.0-1238/1735744 PCT/US2005/010866, 4 pages.

International Search Report for PCT/US2005/010866 dated Aug. 1, 2007, 4 pages.

International Preliminary Report on Patentability for PCT Application No. PCT/US2007/071950 dated Jan. 29, 2009, 6 pages.

International Search Report and Written Opinion in International Application No. PCT/US2007/071950 dated Jun. 22, 2007, 10 pages.

International Search Report and Written Opinion for PCT Application No. PCT/US2007/78200, dated Feb. 26, 2008, 8 pages.

International Preliminary Report on Patentability for PCT Application No. PCT/US2007/78200, dated Mar. 26, 2009, 6 pages.

"RFC2109—HTTP State Management Mechanism", faqs.org [online] published Feb. 1997, [retrieved on Oct. 4, 2010]. Retrieved from the Internet: <URL: 0152http://www.faqs.org/rfcs/rfc2109.html>, 17 pages.

* cited by examiner

SECURE CONVERSION TRACKING

CROSS-REFERENCE TO RELATED APPLICATIONS

This application is a continuation application of, and claims priority to, U.S. patent application Ser. No. 11/520,351, titled "Secure Conversion Tracking," filed on Sep. 12, 2006. The disclosure of the foregoing application is incorporated herein by reference in its entirety for all purposes.

RELATED APPLICATIONS

The subject matter of this application is generally related to U.S. patent application Ser. No. 11/477,134, for "Secure and Extensible Pay Per Action Online Advertising," filed Jun. 27, 2006, U.S. patent application Ser. No. 11/379,510, for "Syndicated Trackable Ad Content," filed Apr. 20, 2006, U.S. patent application Ser. No. 11/375,900, for "Serving Advertisements based on Content", filed Apr. 20, 2006, U.S. patent application Ser. No. 10/314,427, for "Method and Apparatus For Serving Relevant Advertisements," filed Feb. 26, 2003. Each of these applications is incorporated by reference herein in its entirety.

TECHNICAL FIELD

The subject matter of this application is generally related to advertising.

BACKGROUND

With cost-per-action ("CPA") online advertising systems, publishers of online advertisements ("ads") are often compensated based on the number of valid "conversions" reported by the advertiser to a payment system. In such systems, a user interacts with an ad on a publisher website and is directed to the "landing page" of an advertiser's website. A "conversion" is said to occur when the user performs a conversion action at the advertiser's website, such as purchase a product, create a new account, provide information, etc.

Conventional CPA advertising provides callback mechanisms for advertisers to report conversions to the payment system. Conversion callbacks, however, can be spoofed ("conversion fraud"), where conversion spammers report the same conversion callback to the payment system multiple times. This is particularly true for systems where the callbacks are generated by the user's browser, since such systems rely on a cookie to tie the conversion to the particular ad impression that was clicked on by the user.

Existing technology to solve conversion fraud often requires that the advertiser and the payment system share a secret key, which can be used to cryptographically sign conversion callback parameters. Without the secret key, a spammer cannot spoof the payment system by issuing invalid conversion callbacks. This conventional approach is deficient, however, in that it relies on the keys being kept secret and can require frequent re-keying and key-versioning.

SUMMARY

In response to a conversion action associated with an online ad, an advertiser sponsoring the ad generates a unique identifier (e.g., a pseudo random number), which is transmitted to a payment system through a user device. In some implementations, the unique identifier can be generated by a payment system in response to a request from an advertiser. The advertiser stores the unique identifier in a secure location that is accessible by the payment system. The payment system compares the received unique identifier with the stored unique identifier. If the received unique identifier matches the stored unique identifier, and if the received unique identifier was not previously generated by the advertiser, then the payment system deems the conversion action to be valid. In some implementations, the advertiser creates a file in a web directory on the advertiser's website and uses the unique identifier as a filename. The payment system crawls the file and determines whether the file was previously crawled (i.e., whether the unique identifier was previously reported to the payment system). If the file was not previously crawled, then the payment system deems the reported conversion valid.

In some implementations, a secure conversion tracking method includes: receiving a conversion notification, the notification including a unique identifier generated by an advertiser in response to a conversion action; determining if the unique identifier was submitted in a previous notification; and if the unique identifier was not submitted in a previous notification, validating the conversion action.

In some implementations, a secure conversion tracking method includes: detecting a conversion action; and responsive to detecting a conversion action, generating a unique identifier; storing the unique identifier in a location that is accessible to a verification process; and generating a conversion notification that includes the unique identifier.

In some implementations, a secure conversion tracking method includes: receiving a request to generate a unique identifier; generating a unique identifier in response to the request; sending the unique identifier to a first device, where the unique identifier is stored at a location accessible to a verification process; receiving a conversion callback from a second device, the conversion callback including the unique identifier; and initiating the verification process to confirm the conversion using the unique identifier.

In some implementations, a method includes: associating a unique identifier with a conversion action related to an advertisement; and validating subsequent conversion actions for the advertisement, including confirming that the subsequent conversion actions are not associated with the unique identifier.

Other implementations of secure conversion tracking are disclosed that are related to systems, methods, apparatuses, computer-readable mediums and user interfaces.

The disclosed implementations of secure conversion tracking can detect invalid conversion callbacks or "conversion spam." The detection of invalid conversion callbacks provides improved accountability between advertisers and a payment system in terms of the number of valid conversions reported. The disclosed implementations do not require any shared keys between advertisers and the payment system. The disclosed implementations provide a secure conversion tracking solution that can be easily adopted and managed by advertisers and payment system operators without making substantial modifications to existing online advertising infrastructures.

DETAILED DESCRIPTION

Online Advertising System Overview

Figure 1:
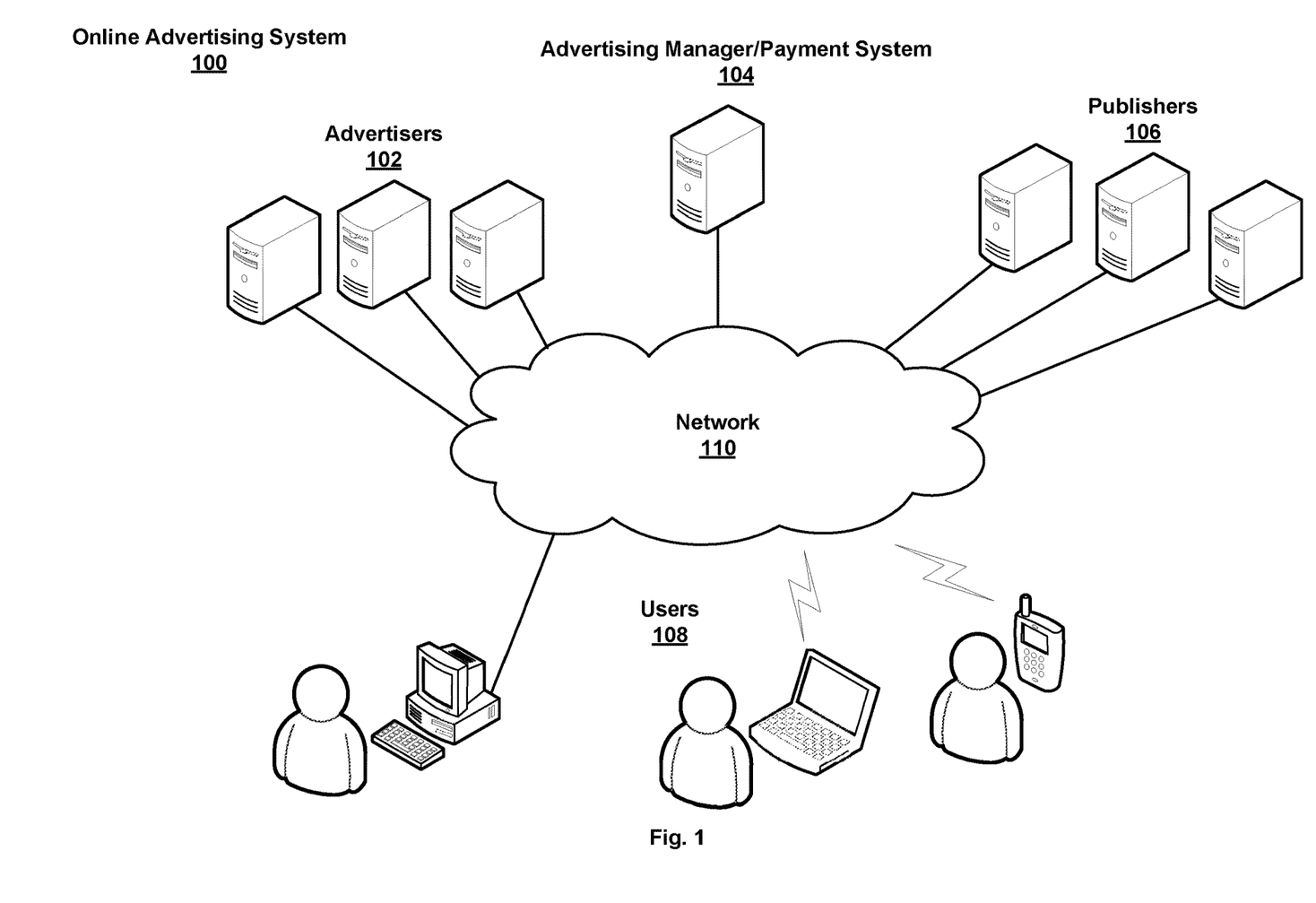
FIG. 1 is a block diagram of an exemplary online advertising system.

FIG. 1 is a schematic diagram of an example of an online advertising system 100. One or more advertisers 102 may directly, or indirectly, enter, maintain, and track ad information in an advertising manager and payment system 104. The ads may be in the form of graphical ads such as banner ads, text only ads, image ads, audio ads, video ads, ads combining one of more of any of such components, etc. The ads may also include embedded information, such as a link, meta-information, and/or machine executable instructions. One or more publishers 106 may submit requests for ads to, and accept ads responsive to their request from, the system 104. Publishers 106 may also provide usage information to the system 104.

Other entities, such as users 108 and advertisers 102, may provide usage information (e.g., whether or not a conversion or click-through related to the ad occurred) to the system 104. This usage information may include measured or observed user behavior related to ads that have been served. The system 104 performs financial transactions, such as crediting the publishers 106 and charging the advertisers 102, based on the usage information. A computer network 110, such as a local area network (LAN), wide area network (WAN), the Internet, an intranet, a peer-to-peer network, a wireless network, or a combination thereof, connects the advertisers 102, the system 104, the publishers 106, and the users 108.

One example of a publisher 106 is a general content server that receives requests for content (e.g., articles, discussion threads, music, video, graphics, search results, web page listings, etc.), and retrieves the requested content in response to, or otherwise services, the request. The content server may submit a request for ads to the system 104. Such an ad request may include a number of ads desired. The ad request may also include content request information. This information may include the content itself (e.g., page), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

The content server may combine the requested content with one or more of the advertisements provided by the system 104. This combined information including the content and advertisement(s) is then forwarded to the user 108 that requested the content, for presentation to the viewer. Finally, the content server may transmit information about the ads and how, when, and/or where the ads are to be rendered (e.g., position, click-through or not, impression time, impression date, size, conversion or not, etc.) back to the system 104. Alternatively, or in addition, such information may be provided back to the system 104 by some other means.

Another example of a publisher 106 is a search engine. A search engine may receive queries for search results. In response, the search engine may retrieve relevant search results (e.g., from an index of web pages). An exemplary search engine is described in the article S. Brin and L. Page, "The Anatomy of a Large-Scale Hypertextual Search Engine," Seventh International World Wide Web Conference, Brisbane, Australia and in U.S. Pat. No. 6,285,999, both of which are incorporated herein by reference each in their entirety. Such search results may include, for example, lists of web page titles, snippets of text extracted from those web pages, and hypertext links to those web pages, and may be grouped into a predetermined number of (e.g., ten) search results.

The search engine may submit a request for ads to the system 104. The request may include a number of ads desired. This number may depend on the search results, the amount of screen or page space occupied by the search results, the size and shape of the ads, etc. In one implementation, the number of desired ads will be from one to ten, and preferably from three to five. The request for ads may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., web pages), full text of identified documents, feature vectors of identified documents, etc.

The search engine may combine the search results with one or more of the advertisements provided by the system 104. This combined information including the search results and advertisement(s) is then forwarded to the user 108 that requested the content, for presentation to the user 108. Preferably, the search results are maintained as distinct from the ads, so as not to confuse the user between paid advertisements and presumably neutral search results.

Finally, the search engine may transmit information about the ad and when, where, and/or how the ad was to be rendered (e.g., position, click-through or not, impression time, impression date, size, conversion or not, etc.) back to the system 104. Alternatively, or in addition, such information may be provided back to the system 104 by some other means.

As can be appreciated from the foregoing, the advertising system manager/payment system 104 may serve publishers 106 such as content servers and search engines. The serving of ads targeted to the search results page generated by a search engine is known. The proposed system further permits the serving of ads targeted to documents served by content servers. For example, a network or inter-network may include an ad server serving targeted ads in response to requests from a search engine with ad spots for sale. Suppose that the inter-network is the World Wide Web. The search engine crawls much or all of the content. Some of this content will include ad spots (also referred to as "inventory") available. More specifically, one or more content servers may include one or more documents. Documents may include content, embedded information such as meta-information and machine executable instructions, and ad spots available. Note that ads inserted into ad spots in a document can vary each time the document is served. Alternatively, ads inserted into ad spots can have a static association with a given document. An ad server may use the results of a separate crawl of the some or all of the content with ad spots available.

Secure Conversion Tracking System

Figure 2:
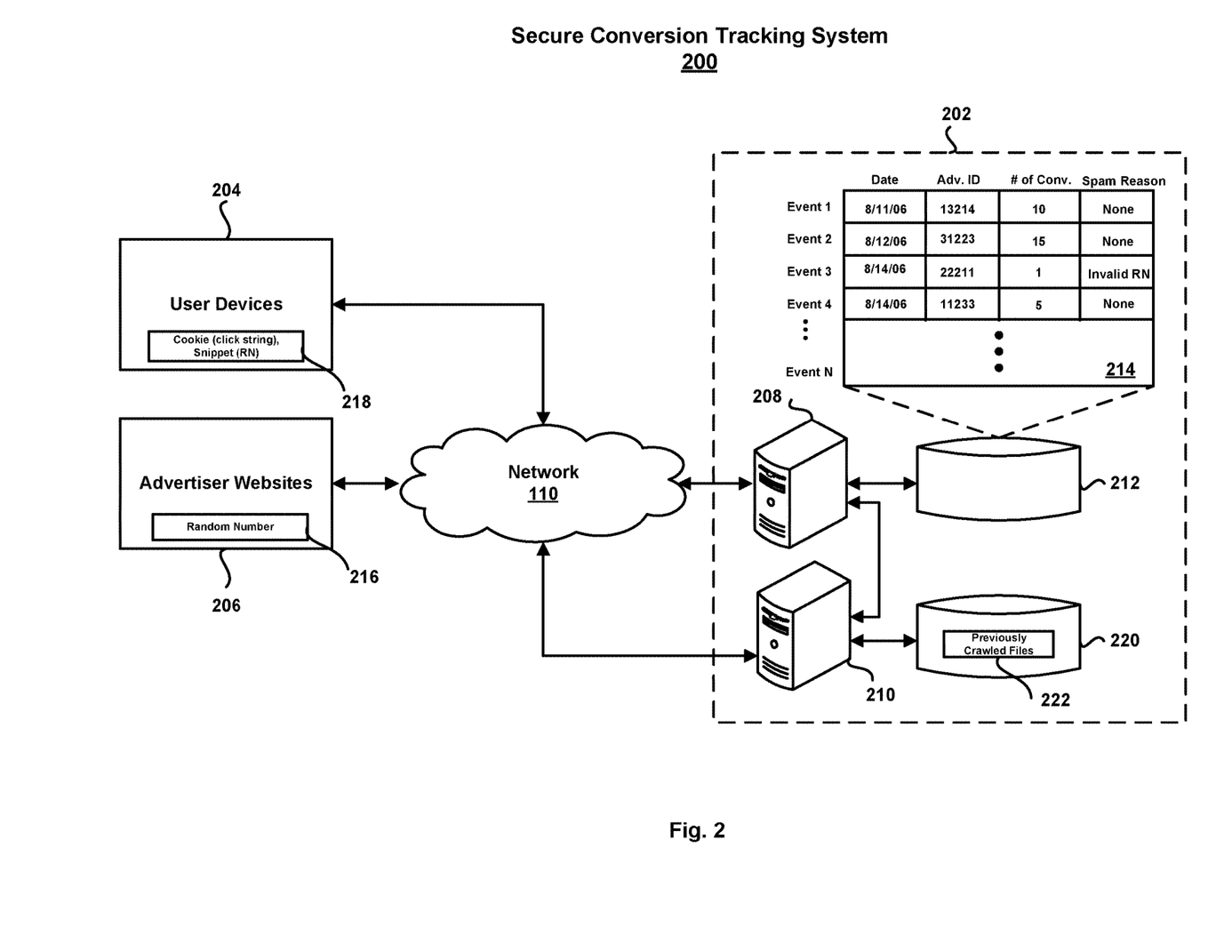
FIG. 2 is a block diagram of an exemplary secure conversion tracking system.

FIG. 2 is a block diagram of an exemplary secure conversion tracking system 200. In some implementations, the system 200 includes a payment system 202, one or more user devices 204, and one or more advertiser websites 206. The payment system 202 further includes a payment server 208, a verification server 210 and a repository 212. The payment system 202 communicates with user devices 204 and advertiser websites 206 through the network 110.

The user devices 204 can be any device capable of receiving ads, including but not limited to: personal computers, mobile devices, cell phones, media players/recorders, music players, game consoles, media centers, media players, tablets, personal digital assistants (PDAs), television systems, removable storage devices, etc. The advertiser websites 206 can include "landing pages" that a user is directed to when the user clicks an ad presented on a publisher website. In some implementations, the ad can be provided by an ad server associated with the payment system 202, such as described in U.S. patent application Ser. No. 11/477,134, for "Secure and Extensible Pay Per Action Online Advertising."

In operation, when a user clicks on an ad on a webpage displayed on a user device 204 ("ad click"), the server 208 is notified of the ad click, and in response to the notification places a conversion cookie on the user device 204 (e.g., in a browser file 218). The cookie includes information (e.g., an ad click string) that can be used by the payment system 202 to tie the conversion action back to the ad that was clicked by the user at the user device 204. When the user clicks on the ad, a browser running on the user device 204 is directed to a landing page of the advertiser's website 206. If the user completes a conversion action at the advertiser's website 206 (e.g., makes purchase, creates an account, provides information), a unique identifier generator at the advertiser's website 206 generates a unique identifier (e.g., a random number ("RN")), which is stored in a data structure 216 (e.g., a database). The data structure 216 is made accessible to the payment system 202 through network 110. In some implementations, the advertiser's website 206 creates a file in a web server directory or other desired storage location using the unique identifier as a filename.

A web server or other device at the advertiser's website 206 generates a conversion snippet including the unique identifier as a parameter, and returns the conversion snippet to the user device 204. In some implementations, conversion snippets are portions of code (e.g., JavaScript®) that can be executed by a browser running on the user device 204, as described in U.S. patent application Ser. No. 11/477,134, for "Secure and Extensible Pay Per Action Online Advertising." A "snippet" is a method used by a web server to ask a web browser running on a user device to perform actions after downloading a web page. A "snippet" is typically implemented in JavaScript® code. However, a "snippet" can also be part of HTML web page content.

The user device 204 generates a conversion notification (hereinafter also referred to as a "conversion callback") to the server 208 in the payment system 202, and includes the unique identifier as a callback parameter. Conversion callbacks can be implemented using known web protocols and technologies (e.g., HTTP, Java®). In some implementations, the verification server 210 verifies the conversion action by, for example, crawling the unique identifier file previously stored in the web server directory of the advertiser's website 206. Because the web server's directory cannot be listed, the only way to fetch a file with the unique identifier as the filename is to know the unique identifier. Guessing the unique identifier will likely not result in a successful crawling of the file. In such implementations, the advertiser's website 206 can be protected using passwords and other convention security schemes to prevent users from modifying the filenames in the advertiser's web server directory. Examples of web crawlers include open source crawlers written in Java®, such as Heritrix™, WebSPHINX™, JSpider™, WebEater™, Java Web Crawler™, WebLech™, Arachnid™, etc.

If the file is found and has not been crawled before, then the conversion is deemed valid by the payment system 202. If a file was previously crawled, the filename of the file can be included in a list 222 of filenames of previously crawled files stored in a repository 220 (e.g., cache) of the payment system 202. For subsequent conversion events, the filename for the file to be crawled can be compared to the list 222 to determine if the file was previously crawled. If there is no match, the conversion is deemed valid and the filename can be added to the list 222. If there is a match, the conversion is deemed invalid and the conversion is likely to be "conversion spam." If a match occurs, the verification server 210 can take an appropriate action, such as, for example, not counting the conversion for compensation purposes. In some implementations, the advertiser can delete or archive its conversion files on a scheduled basis (e.g., a few days) or in response to a trigger event.

In some implementations, a time window can be specified for determining if a file has been previously crawled. For example, the verification server 210 may only look at the last k days (e.g., 30 days) to determine if a given file was crawled.

In some implementations, the server 208 maintains a table 214 of conversion events in the repository 212. Each row of the table 214 can include information related to a conversion event. For example, the columns of the table 214 can be the date of the conversion, advertiser ID, total of the number of valid conversions for advertiser ID and a spam reason. Other formats for the table 214 are possible, including formats with more or fewer fields or different types of fields. If a conversion is deemed invalid, then the "spam reason" could be described in the table 214. The contents of table 214 can be used by an accounting service (e.g., accounting service 628 of FIG. 6) to determine payments. In the example shown, "Event 3" resulted in a match, so the conversion count was set to "1" and the spam response was marked as "Invalid RN," specifying a random number (i.e., a unique identifier). The conversion count field in table 214 was set to "1", so that repeated use of a unique identifier is recorded as a single conversion.

With the secure conversion tracking system 200, conversion spam is thwarted because it is difficult, if not impossible, for a conversion spammer to guess the unique identifier generated by the advertiser, and the spammer cannot list unique identifier files in the advertiser's web servers directory without breaching the security of the advertiser's website 206. The advertisers website can be made secure with passwords and other known security techniques. Each time the web servers directory is crawled, or on a scheduled basis, the payment system 202 can determine if the web servers directory is secure and warn the advertiser operating the web servers directory of the potential security risk. This can be done by attempting to list the content of a given web server directory using, for example, the HTTP protocol. If the directory can be listed, the directory is not secure because a spammer may use the same method to obtain all the filenames (i.e., the unique identifiers) in the directory. Whether a directory can be listed using HTTP protocol is controlled by the configuration of the advertiser's web server.

Once a unique identifier has been used it can be marked by the verification server 210 as "expired," so that it will not be used again by a given advertiser or by any advertiser for a predetermined period of time.

Secure Conversion Tracking Process (Payment System Side)

Figure 3:
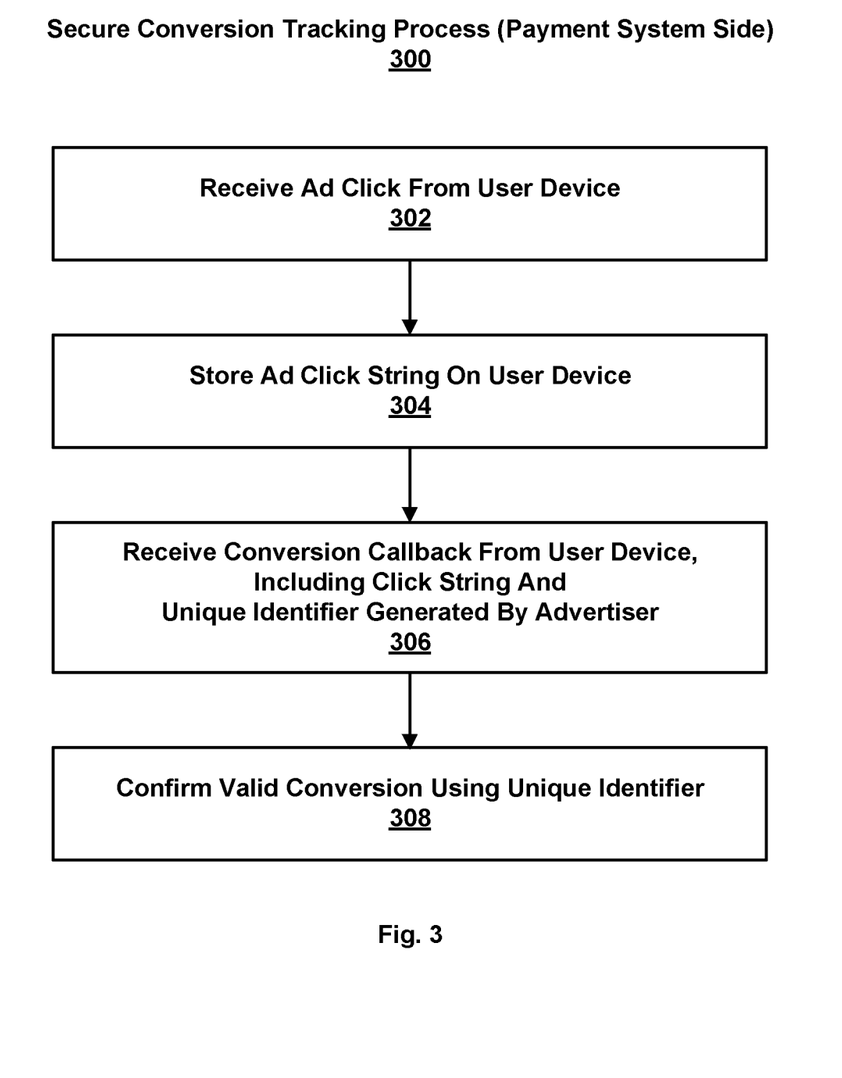
FIG. 3 is a flow diagram of an exemplary secure conversion process (payment system side).

FIG. 3 is a flow diagram of an exemplary secure conversion process 300 which can be performed by the payment system 202 of FIG. 2. In some implementations, the process 300 begins when the payment system 202 receives an ad click (302), or other indication from a user device 204, that a user has interacted with an ad presented on a webpage through, for example, a web browser. In response to receiving the ad click, the payment system 202 stores the ad click string on the user device (304). For example, the payment system 202 can generate a cookie that includes the ad click string, and then places the cookie in a web browser file (e.g., Microsoft® Explorer) located on, or accessible to, the user device 204. If the user performs a conversion action, the advertiser associated with the ad generates and stores a unique identifier (e.g., a random number) locally at the advertiser's website 206, as described in reference to FIG. 4. The advertiser then generates a conversion snippet (or other conversion reporting mechanism) that includes the unique identifier as a parameter, and returns the snippet to the user device 204. The user device 204 generates a conversion callback to the payment system 202, including the ad click string and the unique identifier, which is received (306) by the payment system 202. The unique identifier is used by a verification service (e.g., verification service 624 in FIG. 6) running on the verification server 210 of the payment system 202 to determine if the conversion is invalid (308).

In some implementations, the verification service (e.g., a web crawler) crawls a web server directory associated with the advertiser's website 206 and fetches a file having the unique identifier as a filename. If the filename exists, and the file was not crawled before by the verification service, the conversion action is deemed valid. The verification can be performed in real time or as a background process. For example, multiple conversion callbacks can be accumulated over a period of time (e.g., a day), and verified as a batch process at the end of the accumulation period.

In some implementations, the results of the process 300 are stored by the payment system 202 in a table (e.g., table 214) or other suitable data structure. The contents of the table can then be used by an accounting service for purposes of determining compensation, performing a security procedure or any other desired procedure or action. For accounting purposes, the contents of the table can be compared against the advertiser's conversion records to determine accountability between the advertiser and the payment system 202. For security purposes, historical data and statistical methods can be used with the contents of the table to determine if a given advertiser is impacted by conversion spam, spoofing or other fraudulent activity.

Secure Conversion Tracking Process (Advertiser Side)

Figure 4:
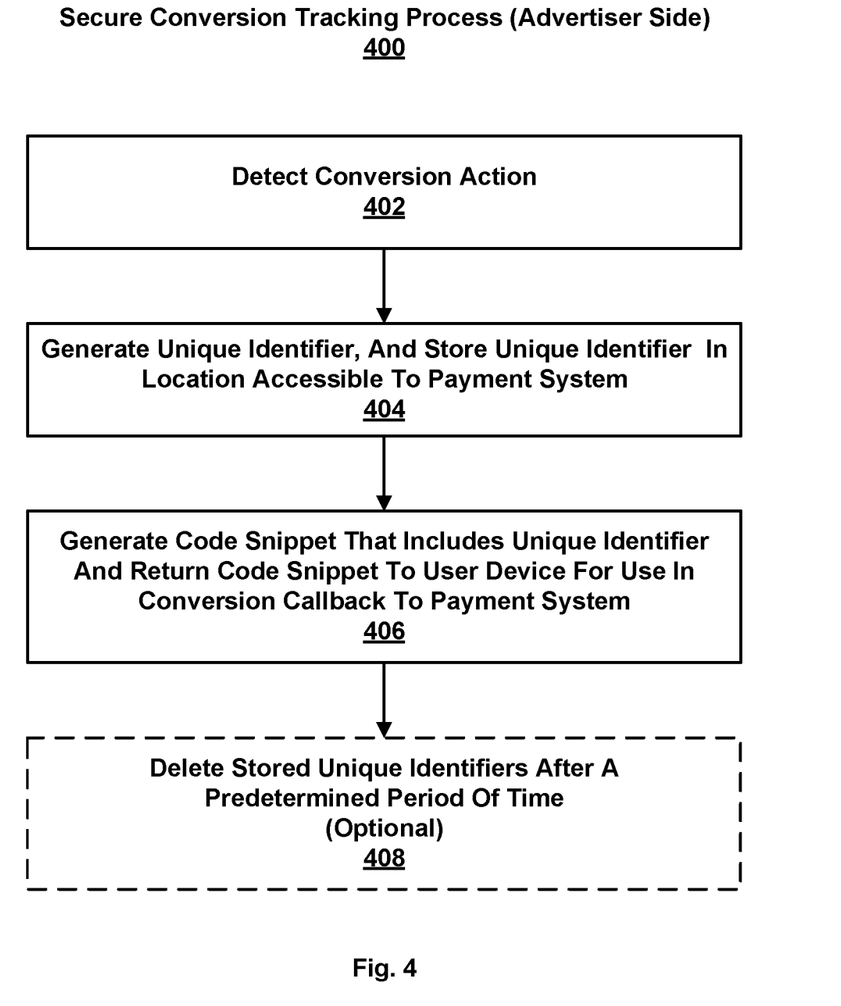
FIG. 4 is a flow diagram of an exemplary secure conversion process (advertiser side).

FIG. 4 is a flow diagram of an exemplary secure conversion process 400 which can be performed by advertisers 206.

The process 400 begins when a conversion action is detected (402) by the advertiser's website 206. A conversion action can be any action taken by the user of the user device 204, including but not limited to making a purchase, creating an account, registering a product, etc. The detection of conversion actions is described in U.S. patent application Ser. No. 11/477,134, for "Secure and Extensible Pay Per Action Online Advertising."

If a conversion action is detected, the advertiser generates a unique or unique identifier and stores the unique identifier in a location accessible to the payment system (404). In some implementations, a file is generated in a web server directory that has the unique identifier as a filename. The file can be crawled by the payment system 202 as part of a verification process, as described in reference to FIG. 3. In other implementations, the unique identifier can be stored in a database or other data structure that is accessible by the payment system 202. Various known techniques can be used to generate the unique identifier. A unique identifier can be a Universally Unique Identifier (UUID), such as a pseudo random number (e.g., a 128-bit number), such as described in the UUID standard of the Open Source Foundation (OSF). The unique identifier can be written in text as a sequence of hexadecimal digits, alphanumeric characters and/or symbols (e.g., hyphens). In some implementations, a unique identifier can be encoded into a string of characters using a positional numeral system (e.g., base 64).

A code snippet that includes the unique identifier can be generated by the advertiser and made accessible to a user device 204 for use in a conversion callback to the payment system (406), as described in reference to FIG. 3. The advertiser can optionally delete stored unique identifiers (e.g., files with unique identifier filenames) after a predetermined period of time (e.g., a few days) or upon a trigger event (408) (e.g., a command from a system administrator).

Alternative Secure Conversion Tracking Process (Payment System Side)

Figure 5:
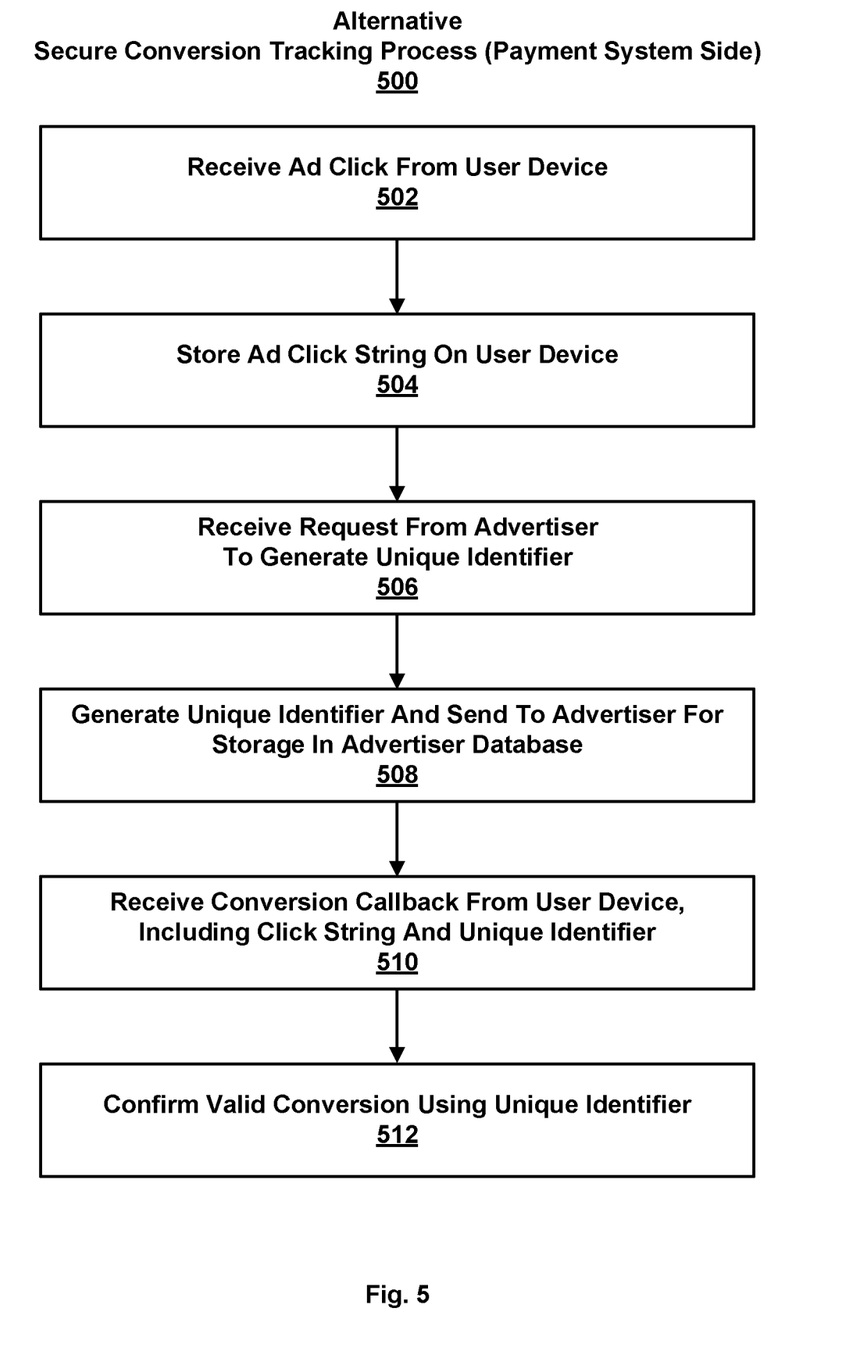
FIG. 5 is a flow diagram of an alternative secure conversion process (payment system side).

FIG. 5 is a flow diagram of an alternative secure conversion process 500, which can be performed by a payment system 202. In some implementations, the process 500 begins when the payment system 202 receives an ad click (502) or other indication from a user device 204 that a user has interacted with an ad presented on a webpage through, for example, a web browser. In response to receiving the ad click, the payment system 202 stores the ad click string on the user device (504). For example, the payment system 202 can generate a cookie that includes the ad click string, and then puts the cookie in a web browser file (e.g., Microsoft® Explorer) located on, or accessible to, the user device 204.

In contrast to the process of FIG. 3, the payment system 202 receives a request for a unique identifier from the advertiser (506). The request can be made through an application programming interface (API) call if an API exists between the advertiser and the payment system 202. The payment system 202 generates the unique identifier and returns (e.g., through an API call) the unique identifier to the advertiser's website 206, and at the same time stores the unique identifier in a database or other data structure of the payment system 202. The advertiser then generates a conversion snippet that includes the unique identifier as a parameter, and returns the conversion snippet to the user device.

The user device 204 generates a conversion callback to the payment system 202, including the ad click string and the unique identifier, which is received by the payment system (510). The unique identifier is used by a verification service of the payment system to determine if the conversion is invalid (512). In some implementations, the verification service looks for the presence of the unique identifier in the database or other data structure of the payment system 202. If the unique identifier exists and has not been used before, the conversion action is deemed valid.

The results of the process 500 are stored by the payment system 202 in a table (e.g., table 214) or other suitable data structure. The contents of the table can then be used by an accounting service for purposes of determining compensation, for performing a security procedure or for any other desired purpose.

Like the process 300, spamming is thwarted because it would be difficult, if not impossible, for a spammer to guess the unique identifier provided by the payment system 202. The communication channel between the advertiser and the payment system 202 can be made secure to prevent eavesdropping. For example, at the beginning of an API call to the payment system 202, the payment system 202 can verify the identity of the advertiser by its user name and password. Other security measures are possible.

Payment System Architecture

Figure 6:
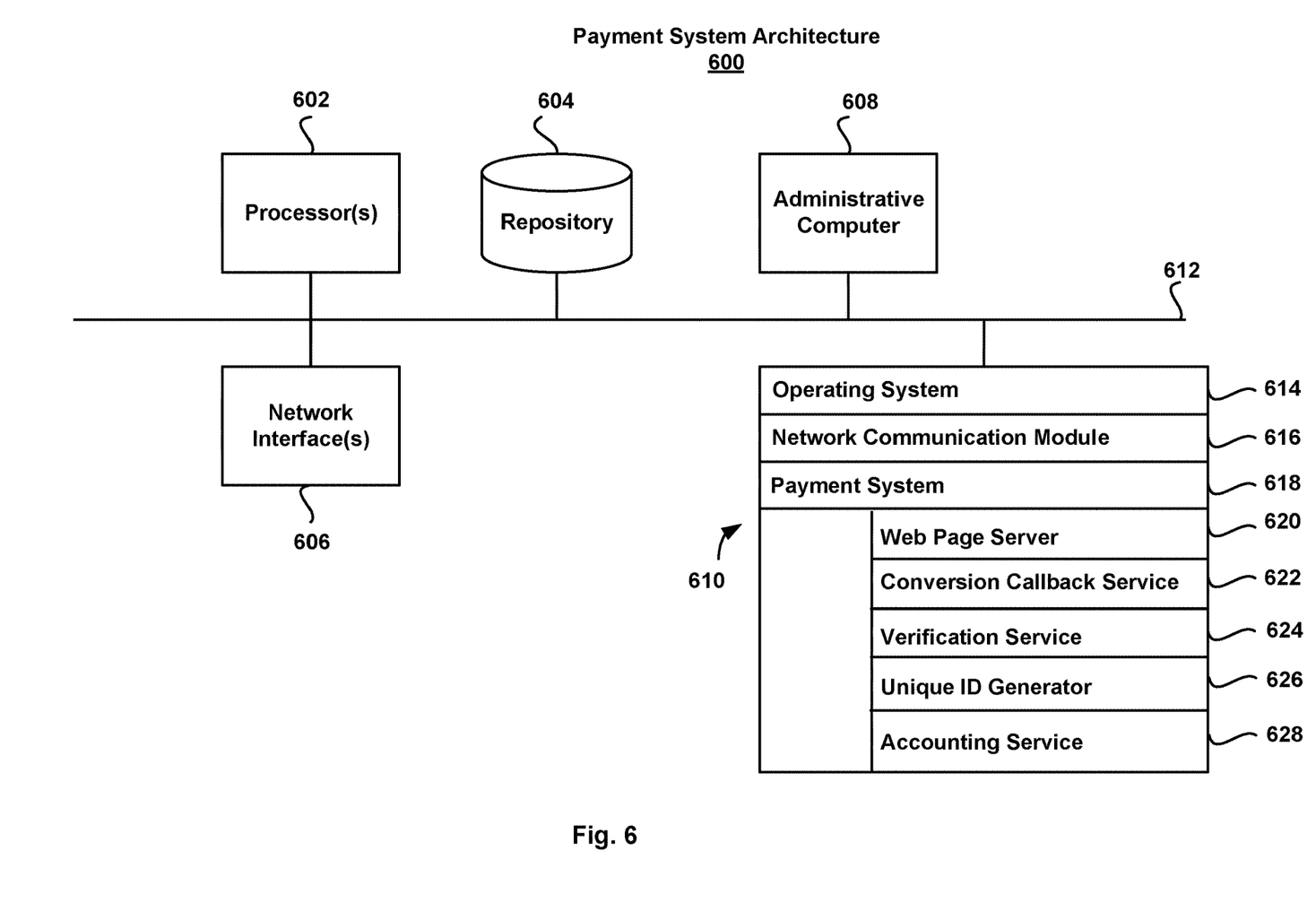
FIG. 6 is a block diagram of an exemplary architecture for a secure conversion tracking system.

FIG. 6 is a block diagram of exemplary payment system architecture 600. Other architectures are possible, including architectures with more or fewer components. The components of the architecture 600 can be implemented in software, hardware and/or firmware. Software components can be implemented using any known programming languages and technologies (e.g., C++, Objective-C, Java™, XML, HTML, Perl™). The software components can include one or more modules, libraries, files, etc.

In some implementations, the architecture 600 includes one or more processors 602 (e.g., dual-core Intel® Xeon® Processors), one or more repositories 604, one or more network interfaces 606, an optional administrative computer 608 and one or more computer-readable mediums 610 (e.g., RAM, ROM, SDRAM, hard disk, optical disk, flash memory, etc.). These components can exchange communications and data over one or more communication channels 612 (e.g., Ethernet) which can include various known network devices (e.g., routers, hubs, gateways, buses) and software (e.g., middleware) for facilitating the transfer of data and control signals between devices.

The term "computer-readable medium" refers to any medium that participates in providing instructions to a processor 602 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 610 further includes an operating system 614 (e.g., Linux® server, Mac OS® server, Windows® NT server), a network communication module 616 and a payment system 618.

The operating system 614 can be multi-user, multiprocessing, multitasking, multithreading, real-time and the like. The operating system 614 performs basic tasks, including but not limited to: recognizing input from and providing output to the administrator computer 608; keeping track of files and directories on computer-readable mediums 610 (e.g., memory or a storage device); controlling peripheral devices (e.g., repository 604); and managing traffic on the one or more communication channels 612. The network communications module 616 includes various components for establishing and maintaining network connections (e.g., software for implementing communication protocols, such as TCP/IP, HTTP, Ethernet, etc.).

The payment system 618 includes a web page server 620, a conversion callback service 622, a verification service 624, a unique identifier generator 626 and an accounting service 628. The payment system 618 is responsible for implementing the secure conversion tracking processes, as described in reference to FIGS. 1-5. The secure conversion tracking processes can be fully or partially automated, and can include human intervention at one or more points in the secure conversion tracking processes.

In some implementations, the web page server 620 (e.g., Apache® web page server) serves web pages to advertisers and publishers and provides an input means for advertisers and publishers to provide input into the payment system 618. The conversion callback service 622 provides various processes for managing the processing of conversion callbacks, including generating code snippets with unique identifiers, etc. The verification service 624 provides various processes (e.g., a web crawler) for verifying the unique identifier that is stored by the advertiser. The unique identifier generator 626 provides unique identifiers in accordance with the alternative secure conversion tracking process 500 described in reference to FIG. 5. The unique identifier generator 626 can be implemented in software using known technology, functions or OS services (e.g., Linux® random( ) function). The accounting service 628 manages accounting associated with conversion tracking, such as, for example, generating and maintaining the Table 214 shown in FIG. 2.

Various modifications can be made to the disclosed implementations and still be within the scope of the following claims.

What is claimed is:

1. A secure conversion tracking method that does not require a secret key, comprising:
   detecting, by one or more processors, a conversion action;
   responsive to detecting a conversion action:
      automatically generating, by the one or more processors, a unique identifier corresponding to the conversion action;
      generating and storing a file having the automatically generated unique identifier as a filename in a web server directory of a website, the stored file being accessible to a verification process by the filename;
      generating, by one or more processors, a conversion notification that includes the automatically generated unique identifier; and
      providing, by one or more processors, the automatically generated unique identifier and conversion notification to a second device:
   performing a verification process that classifies the conversion action as valid when the automatically generated unique identifier was previously generated and stored, but not previously submitted with prior conversion notifications and classifies the conversion action as invalid when the automatically generated unique identifier was previously submitted with the prior conversion notifications.

2. The method of claim 1, comprising sending the conversion notification to a user device for use in a conversion callback to a payment system.

3. The method of claim 1, comprising deleting the stored file after a period of time has elapsed.

4. The method of claim 1, wherein generating a conversion notification comprises:

generating a code snippet that includes the automatically generated unique identifier.

5. The method of claim 1, wherein performing a verification process comprises performing the verification process without requiring a shared key exchange.

6. The method of claim 1, comprising receiving a conversion callback that includes the unique identifier as a callback parameter, wherein performing the verification process includes determining whether the stored file having a filename matching the unique identifier specified in the callback parameters has been previously crawled.

7. The method of claim 6, comprising invalidating the conversion callback when the stored file having the filename matching the unique identifier has been previously crawled.

8. A system comprising:
a verification server; and
a non-transitory computer readable medium storing instructions that when executed by the verification server, cause the verification server to perform operations including:
detecting a conversion action;
responsive to detecting a conversion action:
automatically generating a unique identifier corresponding to the conversion action;
generating and storing a file having the automatically generated unique identifier as a filename in a web server directory of a website, the stored file being accessible to a verification process by the filename;
generating, by one or more processors, a conversion notification that includes the automatically generated unique identifier; and
providing the automatically generated unique identifier and conversion notification to a second device:
performing a verification process that classifies the conversion action as valid when the automatically generated unique identifier was previously generated and stored, but not previously submitted with prior conversion notifications and classifies the conversion action as invalid when the automatically generated unique identifier was previously submitted with the prior conversion notifications.

9. The system of claim 8, wherein the instructions cause the verification server to perform operations comprising sending the conversion notification to a user device for use in a conversion callback to a payment system.

10. The system of claim 8, wherein the instructions cause the verification server to perform operations comprising deleting the stored file after a period of time has elapsed.

11. The system of claim 8, wherein generating a conversion notification comprises:
generating a code snippet that includes the automatically generated unique identifier.

12. The system of claim 8, wherein performing a verification process comprises performing the verification process without requiring a shared key exchange.

13. The system of claim 8, wherein the instructions cause the verification server to perform operations comprising receiving a conversion callback that includes the unique identifier as a callback parameter, wherein performing the verification process includes determining whether the stored file having a filename matching the unique identifier specified in the callback parameters has been previously crawled.

14. The system of claim 13, wherein the instructions cause the verification server to perform operations comprising invalidating the conversion callback when the stored file having the filename matching the unique identifier has been previously crawled.

15. A non-transitory computer readable medium storing instructions that when executed by one or more servers, cause the one or more servers to perform operations including:
detecting a conversion action;
responsive to detecting a conversion action:
automatically generating a unique identifier corresponding to the conversion action;
generating and storing a file having the automatically generated unique identifier as a filename in a web server directory of a website, the stored file being accessible to a verification process by the filename;
generating, by one or more processors, a conversion notification that includes the automatically generated unique identifier; and
providing the automatically generated unique identifier and conversion notification to a second device;
performing a verification process that classifies the conversion action as valid when the automatically generated unique identifier was previously generated and stored, but not previously submitted with prior conversion notifications and classifies the conversion action as invalid when the automatically generated unique identifier was previously submitted with the prior conversion notifications.

16. The computer readable medium of claim 15, wherein the instructions cause the verification server to perform operations comprising sending the conversion notification to a user device for use in a conversion callback to a payment system.

17. The computer readable medium of claim 15, wherein the instructions cause the verification server to perform operations comprising deleting the stored file after a period of time has elapsed.

18. The computer readable medium of claim 15, wherein generating a conversion notification comprises:
generating a code snippet that includes the automatically generated unique identifier.

19. The computer readable medium of claim 15, wherein performing a verification process comprises performing the verification process without requiring a shared key exchange.

20. The computer readable medium of claim 15, wherein the instructions cause the verification server to perform operations comprising receiving a conversion callback that includes the unique identifier as a callback parameter, wherein performing the verification process includes determining whether the stored file having a filename matching the unique identifier specified in the callback parameters has been previously crawled, and invalidating the conversion callback when the stored file having the filename matching the unique identifier has been previously crawled.

* * * * *